Nov. 28, 1967   E. GRECK   3,355,002
METHOD AND APPARATUS FOR DIVIDING THE FLOW OF ARTICLES
Filed Oct. 11, 1965
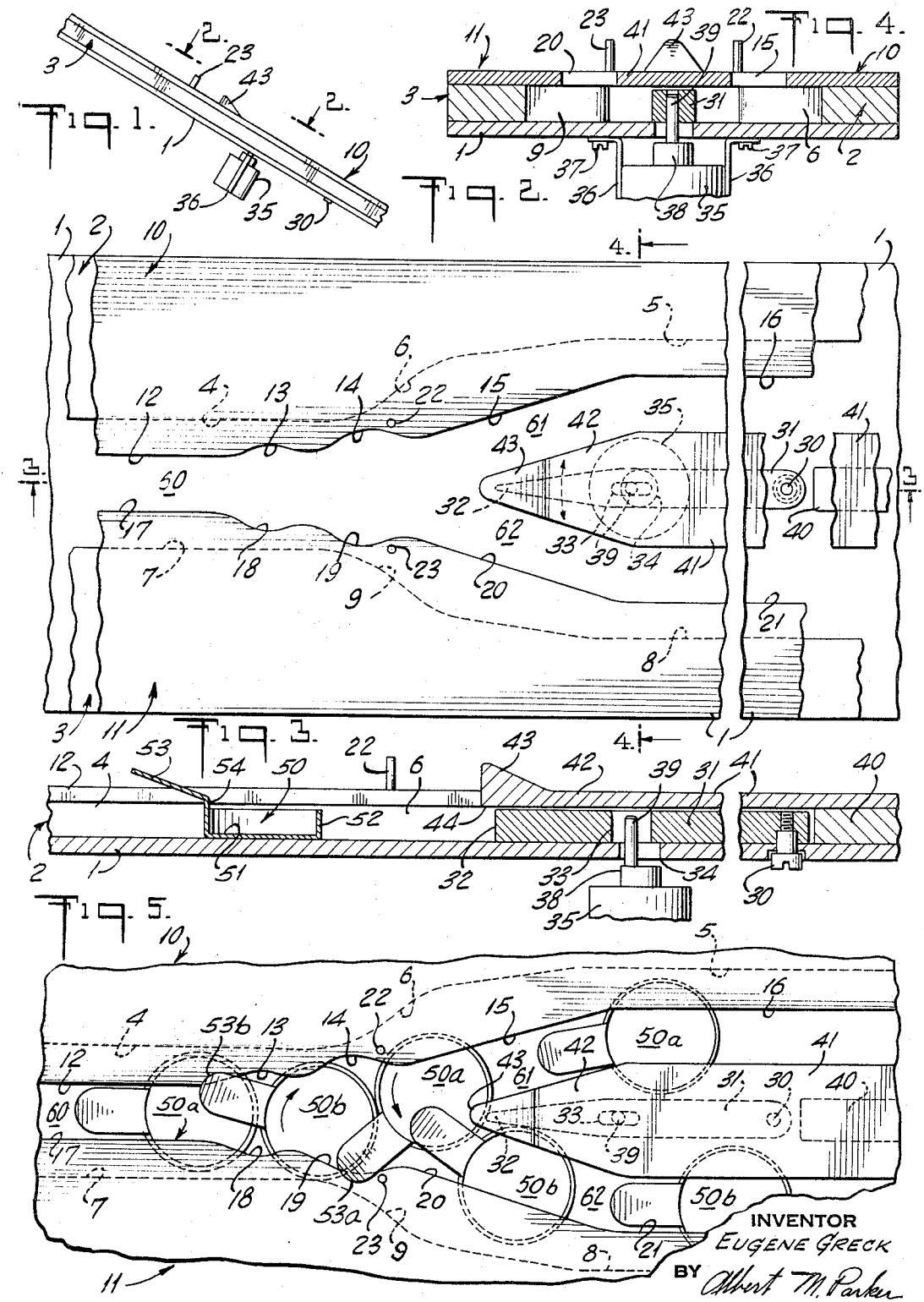
INVENTOR
EUGENE GRECK
BY Albert M. Parker
ATTORNEY

3,355,002
METHOD AND APPARATUS FOR DIVIDING THE FLOW OF ARTICLES
Eugene Greck, Westfield, N.J., assignor to American Flange & Manufacturing Co., Inc., New York, N.Y., a corporation of Delaware
Filed Oct. 11, 1965, Ser. No. 494,457
5 Claims. (Cl. 198—31)

This invention relates to the feeding of articles and is particularly concerned with a method and apparatus for dividing the flow of articles from a single path into two separate paths.

It is frequently desirable in the rapid handling of articles to split the flow of such articles from a single path into two paths so as to feed two separate stations from one source. This seemingly uncomplicated operation poses a number of problems. To begin with it is essential that the dividing operation be performed with a high degree of efficiency. The feeding rate of the two divided paths must very nearly equal the feeding rate of the single path so that any appreciable hesitation or time lost in the dividing operation would render the same impracticable. The incidence of jamming of the articles also has a direct effect on the efficiency of the dividing operation. The most critical area is of course the exact point of divergence from the single path into the divided paths and it is here that jamming is most likely to occur. Whether such jammed articles work themselves free after undue hesitation in the flow of articles or requires the attention of an attendant, the effect is the same and that is to impede the flow of articles rather than expedite their handling.

Splitting the flow of articles equally between two dividing paths is another feature of this invention which has not been effectively achieved with prior art arrangements. It is desirable that the dividing operation accurately feed the two divided paths on an alternate basis and not favor one side or the other. The efficiency and effectiveness of the two stations being fed by the divided paths will suffer if an unbalanced condition exists in the dividing operation. Although it is undesirable to have the articles split between the two divided paths in an unequal manner it is nevertheless advantageous to have the articles continue feeding along one of the divided paths in the event feeding along the other divided path is terminated for any reason and the articles back up to the dividing station. This particular feature, which has also been a problem with prior art arrangements, allows for smooth continuous operation even though one of the stations being fed by the divided paths becomes inoperative.

The novel apparatus and method of this invention embody all of the above mentioned desirable features and eliminate to a substantial degree these troublesome problems commonly encountered in the article handling art. This has been accomplished by providing a novel article handling apparatus and method which divides the flow of articles from a single path into two equally divided paths and performs that operation accurately, efficiently and at relatively high speed.

It is accordingly a principal object of this invention to provide a new and improved method for handling articles.

Another object is to provide a novel apparatus for handling articles.

Another object is to provide new and improved method and apparatus for dividing the flow of article from a single path into two separate paths.

A further object of this invention is to provide a novel apparatus and method for dividing the flow of articles from a single path into two separate and equal paths which together have a flow rate substantially the same as the flow rate of the single path.

A further object of this invention is to divide the flow of articles from a single path into two separate paths at high speed.

A more detailed object is to provide a new and improved method and apparatus for diverting the flow of articles from a single path into either one or two separate paths.

Further and more detailed objects will be partly obvious and in part pointed out as the description of the invention, taken in conjunction with the accompanying drawing, proceeds.

In that drawing:

FIG. 1 is a vertical elevational view of the article handling apparatus of the invention;

FIG. 2 is an enlarged fragmentary top plan view taken on lines 2—2 of FIG. 1 and looking in the direction of the arrows;

FIG. 3 is a vertical sectional view taken on lines 3—3 of FIG. 2 and looking in the direction of the arrows;

FIG. 4 is another vertical sectional view taken on lines 4—4 of FIG. 2 and looking in the direction of the arrows; and FIG. 5 is a top plan view similar to FIG. 2 showing articles being fed in a single path and being divided into two separate paths.

The particular article being handled, as disclosed in conjunction with the description hereinafter to be made of the novel apparatus and method of this invention, is shown in FIG. 3 as a lightweight metal cap 50 having a flat disc-like panel 51 surrounded by an upstanding cylindrical wall 52 and having a radially outwardly projecting ear 53 which is connected to the wall 52 by a short neck portion 54. It is to be understood, however, that the novel apparatus and method of this invention is capable of handling many different sizes and shapes of articles and the description of the particular article as set forth above is not to be construed as a limitation.

As shown in FIGS. 1 and 2, the article handling apparatus of the invention comprises a base plate 1 which is secured to any suitable frame (not shown) which will retain said plate at an angle or slope. A pair of spacer members 2 and 3 are secured to the top surface of the base plate 1 and are positioned along respective longitudinal edges of said plate. The inner edge of the spacer member 2 has a straight article entrance section 4, a straight article exit section 5, and a curved interconnecting section 6. The inner edge of the spacer member 3 has a contour corresponding to member 2 consisting of a straight article entrance section 7, a straight article exit section 8, and a curved interconnection section 9. An elongated article dividing member 31, terminating at one end in a pointed nose 32, is pivotally secured at its other end to the base plate 1 by a pivot pin 30. The dividing member 31 is positioned between the article exit sections 5 and 8 of the spacer members 2 and 3 with the nose 32 thereof extending to a position between the curved sections 6 and 9 of said spacer members 2 and 3. There is thus formed, along the top surface of base plate 1, a straight article entrance path 60 between sections 4 and 7 and a widened portion of said path between sections 6 and 9 of the spacer members 2 and 3. Paths 61 and 62 extend outwardly from the widened portion of said path 60. The dividing member 31 is positioned in the center of said widened portion of path 60 and the side surfaces thereof provide one edge of each of the paths 61 and 62. The rear portion of section 6 and the straight rear exit section 5 of the spacer member 2 forms the other edge of path 61. The rear portion of section 9 and the straight rear exit section 8 of the spacer member 3 forms the other edge of the path 62. The straight portion of the path 60 and the paths 61 and 62 all have a width slightly greater than the width or diameter of the particular article being handled so that such articles freely move in said paths one behind the other.

A pair of plates 10 and 11 overlie the spacer members 2 and 3 respectively and each have an inner edge which extends over the paths 60, 61 and 62. The inner edge of plate 10 has a straight article entrance section 12, a first concave section 13, a second concave section 14, an outwardly angled section 15, and a straight article exit section 16. Similarly the inner edge of plate 11 has a contour corresponding to plate 10 consisting of a straight article entrance section 17, a first concave section 18, a second concave section 19, an outwardly angled section 20, and a straight, article exit section 21. A stationary central guide plate 41, supported by a spacer block 40 secured to the base plate 1, is positioned in the same plane as the plates 10, 11 and in vertical and longitudinal alignment with the dividing member 31. The guide plate 41, like the underlying dividing member 31 has a pointed nose 42 formed at its leading end, the outer end of which is thickened as clearly seen at 43 in FIGS. 3 and 4. The guide plate 41 is substantially wider than the underlying dividing member 31 and is somewhat longer so that the thickened tip 43 of the guide plate nose 42 extends beyond the nose 32 of the underlying dividing member 31 as indicated at 44 in FIG. 3. A passageway slightly wider than the width of the ear 53 of the article 50 being handled is formed between sections 12 and 17 of plates 10 and 11, between sections 15 and 16 of plate 10 and one edge of the guide plate 41, and between sections 20 and 21 of plate 11 and the other edge of the guide plate 41. As shown more clearly in FIG. 3 the spacer plates 2 and 3 have a thickness slightly greater than the height of the cylindrical wall 52 of the article 50 being conveyed so that such article may be freely moved in paths 60, 61 and 62 but at the same time be restrained from upward movement by the inner edges of the overlying plates 10 and 11.

As described above the guide plate nose 42 extends beyond the underlying dividing member 31 as indicated at 44 so that the articles 50, as they move into the widened position of the path 60, are prevented from being thrown outwardly by said overhang 44. As hereinafter to be described the articles are restrained from rotational movement except in those areas defined by the opposed concave sections 13, 18 and 14, 19 on plates 10 and 11 as well as in the widened portion of path 60. To limit the rotation of each article 50 in the widened portion of path 60 there is provided an upstanding pin 22 on plate 10 adjacent the concave section 14 and an upstanding pin 23 on plate 11 adjacent the concave section 19.

As shown in FIGS. 3 and 4 there is formed within the dividing member 31, and spaced from the pivot point thereof, an elongated slot 33 positioned above a circular aperture 34 in base plate 1. A motor 35 having a shaft 38 is mounted to the bottom surface of the base plate 1 by means of a bracket 36 and screws 37. A pin 39, mounted eccentrically to the end surface of motor shaft 38, extends through the plate aperture 34 and into the elongated slot 33. Upon rotation of the motor shaft 38 and pin 39 an oscillatory motion is thus imparted to the nose 32 of the dividing member 31. In the disclosed embodiment it has been found that a motor speed of 1000 r.p.m. and a total oscillating movement of nose 32 of the dividing member 31 of one eighth of an inch provides satisfactory handling of articles 50 as hereinafter to be described.

In operation the articles 50 are oriented by any suitable device (not shown) and are fed along the entrance path 60 with their flat panels 51 in surface contact with the base plate 1 and their ears 53 in trailing position. Any suitable means may be provided for conveying the articles through the dividing operation, however, for purposes of illustration the entire structure is shown in FIG. 1 as being disposed on an incline in order to gravity feed the articles. The articles 50 are gravity fed through the straight entrance path 60 and are confined in a single line. As described above the oscillating nose 32 of the dividing member 31 is positioned to extend into said widened portion of path 60 and operates in the center thereof. Upon contacting the nose 32 of the dividing member 31 an individual article or an article leading a group of articles will be kicked by the oscillating motion of the nose 32 into one or the other of the divided exit paths 61 and 62. As shown in FIG. 5, and for purposes of illustration, the articles 50 are designated alternately 50a and 50b to indicate that the articles 50a flow down path 61 and the articles 50b flow down path 62. As the article 50b starts down path 61 it is still acted upon by the oscillating nose 32. The result is to impart to articles starting down path 61 counterclockwise rotational movement since the point or series of points on the article wall 52 struck by the nose 32 will be accelerated away from the member 31. Also the tendency of the ear 53 to swing downwardly due to gravity aids in this rotational movement. The extent of this rotational movement is limited by the pin 23 which extends upwardly into the path of the ear 53a and prevents said ear from swinging completely around into a leading position. In such position the ear 53a is in alignment with the entrance to path 61. As the article 50a moves into the path 61 the thickened nose 43 of the guide plate 41, which projects upwardly beyond the path of the ear 53a, prevents further counterclockwise rotation of said ear thus eliminating the possibility of impeding the free movement of the article as the article body moves down one path if the article ear should attempt to move down the other path.

As the article 50a moves into the path 61 an adjacent article 50b, if in contact with article 50a, will be subjected to a clockwise rotational movement due to the counterclockwise rotation of article 50a. As article 50a proceeds down the path 61 article 50b will be directed down the path 62 due to the widening out of the single path 60 in the area of the nose 32 causing the articles to assume a staggered relationship. Accordingly, as an article directed toward path 62, contacts the oscillating nose 32 it is further caused to rotate in a clockwise direction in the same manner that article 50a was caused to rotate in a counterclockwise direction. Like the movement of article 50a, the extent of this rotational movement is limited by the pin 22 which extends upwardly into the path of the ear 53b and prevents said ear from swinging completely around into a leading position. In such position the ear 53b is in alignment with the entrance to path 62. In the same manner as during the feeding of article 50a into path 61 the thickened nose 43 of the guide plate 41 prevents further rotational movement of the ear thus eliminating the possibility of impeding the free movement of the article down path 62.

As described above, the rotational movement imparted to the articles 50a and 50b by the oscillation of nose 32 of the dividing member 31 will be imparted to the adjacent articles within path 60. The areas defined by the opposed cut out sections 13, 18 and 14, 19 on the inner edges of plates 10 and 11 provide clearances for the ears 53 so that the articles, as they pass these areas, and being under a rotational force as described above, will be free to rotate a limited amount to provide a pre-orientation of the ears 53 before the articles reach the widened portion of path 60 adjacent the nose 43. In FIG. 5, article 50a, rotated in a counterclockwise direction, is seen as having its ear 53a, oriented in substantial alignment with the path 61. Similarly article 50b is rotated in a clockwise direction so that its ear 53b will be in substantial alignment with the path 62 upon approaching the nose 32. Once the articles enter the respective exit paths 61 and 62 they then return to their initial ear trailing position. This pre-orientation of each article before it reaches the widened portion of path 60 not only reduces the amount or orientation necessary in said widened portion but also allows the articles to smoothly and rapidly shift to a slightly staggered position in said widened portion where the articles are initially alternately fed in paths 61 and 62. When the articles are thus fed in this staggered relationship with their ears properly oriented relative to paths 61 and 62 they can be divided to alternately feed in the paths 61 and 62 at a high rate of speed.

The oscillating nose 32, besides imparting the above described rotational movement to the articles, insures against any sticking or hanging up of the articles at the critical point of divergence. This function of the oscillating member is particularly important in the feeding of symmetrical articles, although the advantages flowing from the invention are by no means limited thereto, where the staggering of the articles as they approach the point of divergence must be kept to a minimum amount in order to accurately control the orientation of the articles. If the articles are allowed to stagger or widen out within the path 60 beyond a limited amount, the article ear might swing around into a leading position.

In the normal operation of the invention the articles are equally divided on an alternate basis feeding first one divided path then the other. However in the event the flow of articles at the work station fed by either divided path 61 or 62 is stopped for any reason, the entire incoming flow of articles will be diverted into the other open path due to the jogging action of the nose 32. Once the stopped work station clears the articles automatically begin feeding both paths again on an equal basis. This feature is particularly advantageous since the invention would normally be employed in fully automated operations where the constant attention of an operator to shift from single track feeding to double track feeding and vice versa could not be tolerated.

Changes in and modifications to the construction and different embodiments of the invention would suggest themselves to those skilled in the art and could be made without departing from the spirit or scope of the invention. It is accordingly intended that all matter contained in the above description, or shown in the accompanying drawing, shall be interpreted as being illustrative and not in a limiting sense.

Having described my invention, what I claim as new and desire to secure by Letters Patent is:

1. The method of dividing the flow of articles from a single path into two separate paths comprising conveying a series of articles in contacting relationship seriatim along an inlet path, staggering said articles so that alternate articles move respectively toward one side and toward the other side of said inlet path while maintaining said contacting relationship, separating said respective alternate articles into two separate outlet paths and imparting to said articles at the point of separation rotational movement in a direction such that the leading portion of said articles rotates away from said point of separation.

2. The method of dividing the flow of radially unsymmetric articles from a single path into two separate paths comprising conveying a series of articles having the same respective orientation about their central axis seriatim along an inlet path, staggering said articles so that alternate articles move respectively toward one side and toward the other side of said inlet path and momentarily changing said orientation, separating said respective alternate articles into two outlet paths and imparting said initial respective orientation to said articles.

3. The method of dividing the flow of articles from a single path into two separate paths said articles having a cylindrical body portion and an ear extending radially outwardly therefrom, comprising conveying a series of articles seriatim along an inlet path with their ears oriented in a trailing position, staggering said articles so that alternate articles move respectively toward one side and toward the other side of said inlet path, rotating said articles moving toward said one side in a direction causing said ear thereof to swing toward said other side and rotating said articles moving toward said other side in a direction causing said ear thereof to swing toward said one side, and separating said respective alternate articles into two separate outlet paths.

4. Apparatus for dividing the flow of articles from a single path into two separate paths, comprising a single article inlet path and first and second article outlet paths, a dividing member in longitudinal alignment with said inlet path and separating said first and second paths said dividing member having an article deflecting nose at one end thereof adjacent said inlet path, and means operatively connected to said dividing member for imparting continuous lateral oscillatory motion to said nose, the frequency of said motion being independent of the article flow rate.

5. In apparatus as set forth in claim 4, said dividing member being elongated and pivotally secured at the other end thereof, and said means connected to said member intermediate said nose end and said pivot end.

References Cited
UNITED STATES PATENTS

| | | | |
|---|---|---|---|
| 2,602,534 | 7/1952 | Hartmann | 198—31 |
| 3,008,564 | 11/1961 | Lakso | 198—31 |

RICHARD E. AEGERTER, *Primary Examiner.*

EVON C. BLUNK, *Examiner.*